S. A. STRICKLAND.
ATTACHMENT FOR MOTOR VEHICLE PUMPS.
APPLICATION FILED APR. 15, 1915.

1,315,256.

Patented Sept. 9, 1919.

Witnesses
Chas. W. Stauffiger
Anna M. Dorr

Inventor
Silas A. Strickland,

By
Attorneys

UNITED STATES PATENT OFFICE.

SILAS A. STRICKLAND, OF DETROIT, MICHIGAN, ASSIGNOR TO DETROIT ACCESSORIES CORPORATION, OF DETROIT, MICHIGAN, A CORPORATION OF MICHIGAN.

ATTACHMENT FOR MOTOR-VEHICLE PUMPS.

1,315,256.     Specification of Letters Patent.     Patented Sept. 9, 1919.

Application filed April 15, 1915. Serial No. 21,569.

*To all whom it may concern:*

Be it known that I, SILAS A. STRICKLAND, a citizen of the United States of America, residing at Detroit, in the county of Wayne and State of Michigan, have invented certain new and useful Improvements in Attachments for Motor-Vehicle Pumps, of which the following is a specification, reference being had therein to the accompanying drawings.

Modern motor vehicles which are equipped with engine starters are usually provided with a forwardly extending crank shaft to which a starting crank may be applied and the frame of the vehicle is usually provided with a bearing to receive the shaft of the starting crank. It is desirable to provide a suitable pump for supplying air to be used in inflating tires and other purposes, and to so arrange such a pump that it may be connected with the forwardly projecting end of the engine crank shaft to be driven thereby. It is necessary to provide suitable means for connecting such a pump with the crank shaft end and also to provide simple means for holding this connecting member in engagement with the crank shaft of the engine and for preventing the bodily rotation of the pump when it is in place and being driven by the rotation of the engine shaft.

It is the object of this invention to provide simple and efficient means for holding the pump body against rotation when applied to a motor vehicle as described, and to prevent the disengagement of the means for driving the pump, from the forwardly projecting end of the engine shaft. A further object of the invention is to provide simple means which may be readily applied to and expanded within the bearing which is provided on the frame for the starting crank, to securely hold the pump against turning bodily and the crank shaft of the pump connected with the crank shaft of the engine while the pump is in use.

With these and other ends in view the invention consists in the matters hereinafter described and more particularly set forth in the appended claims reference being had to the accompanying drawings in which—

Figure 1:
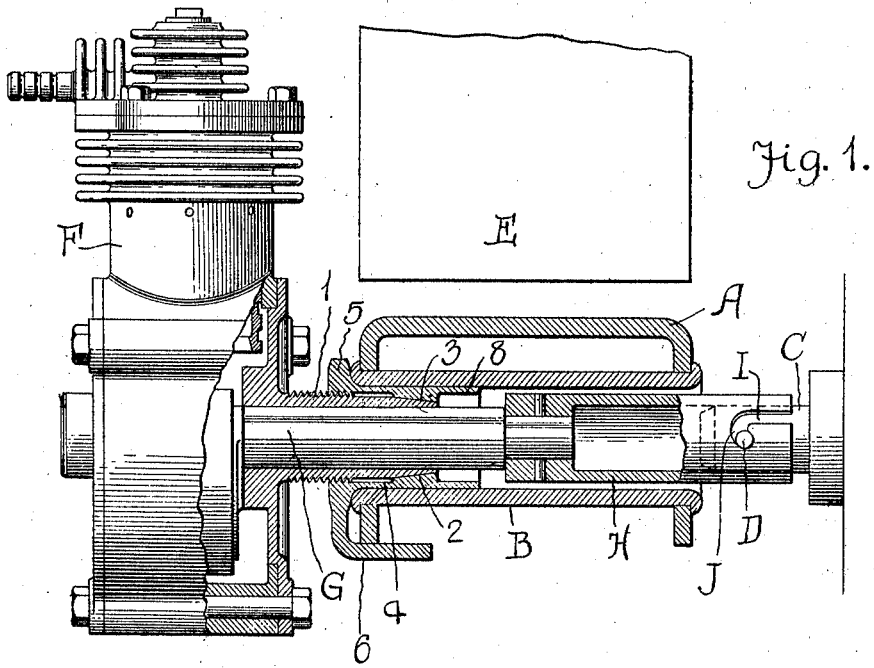
Figure 1 is a side elevation of a suitable air pump showing the same in operative position upon the frame of a motor vehicle and connected to an engine crank shaft, said vehicle parts being shown in vertical section and portions of the pump being also broken away and in section to disclose the construction.
Figure 2:
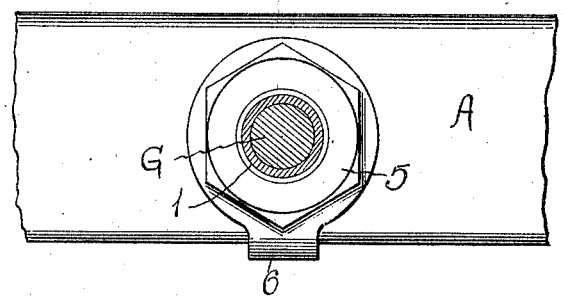
Fig. 2 is a front elevation of a portion of a cross member of a vehicle frame showing a device embodying the invention in engagement therewith.
Figure 3:
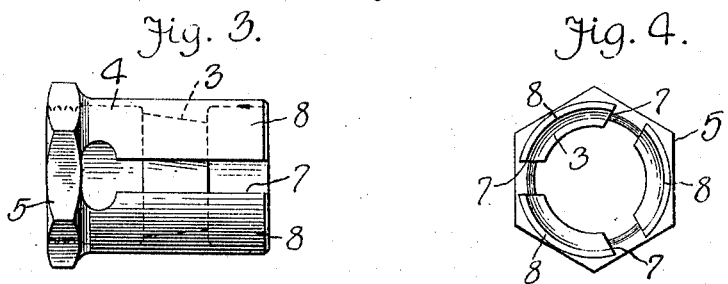
Fig. 3 is a detail view showing a split sleeve in side elevation.
Figure 4:
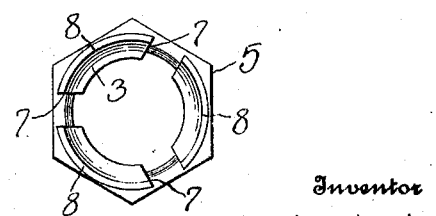
Fig. 4 is an end view of the same.

For convenience of illustration a motor vehicle frame construction is shown in which a channel iron cross member A is provided with a horizontally disposed bearing tube B secured within openings in the side flanges of the channel member and adapted to form a guide bearing for the shaft portion of an ordinary starting crank which is not shown. The forwardly projecting end C of the engine crank shaft is located directly opposite the inner end of the tube B and is provided with a transverse pin D or other suitable means for the engagement therewith of the inner end of the shaft portion of a starting crank in the usual manner. E represents the usual form of radiator located directly above the cross member A of the frame.

Obviously the invention may be applied to motor vehicles in which the frame is provided with any other suitable form of starting crank bearing located directly opposite the projecting end of the engine crank shaft, and while a particular construction of pump is shown in the drawing, obviously any suitable air pumping device adapted to be driven from a rotating shaft may be employed. The pump F shown, is of the single cylinder reciprocating piston type and has a crank shaft within its crank case provided with an extended end portion G projecting through an extended hub 1 on one side of the pump crank case.

Suitable means are provided for connecting the outer end of the pump shaft G with the forward end of the engine shaft C and as illustrated in the drawings, this connection may be a tubular member H which is rigidly secured in any suitable manner to the end of the shaft G and is provided at its opposite end with a longitudinal slot I terminating in a laterally extending curved portion J adapted to receive the pin D when the tubular member H is slipped longitudinally over the end C of the engine shaft. Obviously other forms of connection may be used to detachably connect the shafts G and C.

The hub 1 of the pump crank case is externally screw-threaded and its end is tapered as indicated at 2 to engage a similarly tapered portion 3 of the bore of a split sleeve 4 which is internally screw threaded at its outer end to receive the external screw-threaded portion of the hub. A hexagonal head 5 on the outer end of the sleeve 4 forms a flange thereon and this head may be provided with a bent arm 6 formed integral with the head or of a separate piece adapted to be slipped over the head and welded or otherwise secured thereto. The arm 6 is bent intermediate its ends in a direction longitudinally of the sleeve to extend beneath the lower side of the frame member A and engage the same so that when the sleeve is inserted within the forward end of the bearing tube B, it will be prevented from rotation therein. The sleeve is split as indicated at 7, longitudinally inward from its end opposite that upon which the head 5 is formed thus forming spring fingers or members 8 which are adapted to be expanded or sprung laterally within the bearing tube B by means of the engagement of the taper end 2 of the hub 1 with the tapering bore 3 of the sleeve.

In practice, the air pump F is placed in operative position only when it is desired to operate it for pumping air, it being at other times detached and carried in the tool box or other convenient part of the vehicle. The pump is usually carried with the adapter or tubular member H secured in place upon the crank shaft G and the attaching and holding sleeve 4 assembled upon the hub 1. To place the pump in position for operation, the operator will insert the adapter into the tubular bearing member B and engage its slotted end with the pin D of the engine crank shaft as shown in Fig. 1, the sleeve 4 being at the same time inserted within the outer end of the tubular member B with the bent arm 6 extending beneath the frame member A. By turning the pump in the proper direction, the operator will screw the hub 1 into the split sleeve 4 sufficiently to bring its tapering inner end into contact with the taper portion of the bore of the sleeve and thus expand the sleeve within the tubular member B and frictionally hold the pump casing against turning. This frictional engagement of the sleeve with the bearing B also holds the parts against longitudinal movement within the bearing and thus prevents the accidental disengagement of the adapter H from the end of the engine crank shaft.

By means of the split sleeve, the pump is thus securely held against bodily rotation about the axis of its crank shaft and at the same time the connection of said shaft with the engine crank shaft is maintained, and the construction is such that the pump may be very readily disconnected and removed by simply turning the pump bodily in a backward direction to screw its hub out of the sleeve 4 and permit the sleeve to contract. Upon the contraction of the sleeve said sleeve, hub and shaft with the adapter thereon may be pulled endwise out of the bearing tube B.

Obviously, changes may be made in the construction and arrangement of the parts embodying the invention without departing from the spirit of the invention and I do not therefore limit myself to the particular construction or arrangement shown.

What I claim is:—

1. The combination with a frame member provided with a bearing, and an engine crank shaft in longitudinal alinement with said bearing, of a pump having a shaft adapted to be inserted through the bearing and detachably connected with the engine shaft, and means connected to the pump and expandible within the bearing to frictionally hold the pump against turning bodily about the axis of its shaft.

2. The combination with a pump and a driving shaft therefor having a projecting end, of a member connected to the pump and encircling said shaft to support the pump by the engagement of the same within a bearing opening and expandible thereon to hold the pump against turning about the axis of the shaft.

3. The combination of a pump casing having an extended hub portion and a shaft extending through said hub, said hub being adapted to form the support for the pump when said hub is inserted in a supporting member, and means sleeved upon the hub for engaging the supporting member and holding the casing against turning bodily about the axis of the shaft when power is applied to drive the pump.

4. The combination of a pump casing having an extended hub portion and a shaft extending through said hub, said hub being adapted to form the support for the pump when said hub is inserted in a bearing member, and means adapted to be expanded within said bearing, on the bearing member to frictionally hold the casing against turning about the axis of said shaft.

5. The combination of a pump casing having an extended hub portion and a shaft extending through said hub, said hub being adapted to form the support for the pump when said hub is inserted in a bearing member, and a member sleeved upon the hub and movable longitudinally thereon to expand said member when the same is inserted in a bearing therefor.

6. The combination of a pump having a casing provided with an extended hub adapted to form the sole support of the casing when the hub is inserted in a suitable opening in a bearing chamber, a pump shaft extending through the hub and adapted to be connected at its outer end to a shaft for driving the pump, and a split sleeve on the hub adapted to be inserted in said opening, said sleeve being adapted to be expanded by a relative turning movement of the hub and sleeve.

7. The combination of a pump having a casing provided with an extended hub adapted to form the sole support of the casing when the hub is inserted in a suitable opening in a bearing member, a pump shaft extending through the hub and adapted to be connected at its outer end to a shaft for driving the pump, an expandible member on the hub, and means on the member to engage the bearing member and hold said means against turning.

8. The combination of a pump having a casing provided with an extended hub adapted to form the sole support of the casing when the hub is inserted in a suitable opening in a bearing member, a pump shaft extending through the hub and adapted to be connected at its outer end to a shaft for driving the pump, an expandable member on the hub, and a split sleeve on the hub, said sleeve and hub being in screw-threaded engagement and the end of the hub being tapered to engage a tapering bore of the sleeve.

9. The combination with a frame member provided with a bearing and an engine shaft opposite the bearing, of a pump having a casing provided with an extended hub adapted to engage the bearing and support the casing, a pump shaft extending through said hub and adapted to be detachably connected to the engine shaft to receive motion therefrom, a split sleeve in screwthreaded engagement with the hub, said hub being tapered at its end to engage a tapering bore of the sleeve, and a bent arm on the outer end of the sleeve to engage the frame member.

10. A device for mounting a pump on the front end of a motor vehicle with the pump shaft in alinement with and coupled to a motor shaft consisting of substantially concentric members, one on the vehicle and the other on the pump, and means to lock these members together against relative movement longitudinally of the motor shaft, said means exerting pressure on one of the members substantially radially of their common axis.

11. In combination with a driving shaft on a motor vehicle and a pump body having a pump shaft in substantial alinement with the driving shaft, supporting means on the vehicle adjacent said driving shaft, and means for exerting pressure between the pump body and the supporting means on the vehicle in a direction transverse to the engine shaft to detachably clamp the pump body and first mentioned supporting means securely together against any tendency of the pump body to move longitudinally of the axis of the driving shaft or to rotate in respect thereto.

12. In combination, a support, a driving shaft, a pump body, a pump shaft projecting from the body in substantial alinement with the driving shaft and rotatable with the latter, said pump body and said support constituting two members, a third member, one of the members being capable of movement in a plane substantially perpendicular to the axis of the driving shaft and along a line that substantially intersects the said axis, whereby pressure is exerted to clamp the parts together against rotative movement and against longitudinal movement of the pump body in respect to the driving shaft.

13. A device for mounting a pump on the front end of a motor vehicle with the pump shaft in alinement with and coupled to a motor shaft consisting of substantially concentric members, one on the vehicle and the other on the pump, and means to lock these members together against relative movement, said means exerting pressure on one of the members substantially radially of their common axis.

14. A device for mounting a pump on the front end of a motor vehicle with the pump shaft in alinement with and coupled to a motor shaft consisting of substantially concentric members, one on the vehicle and the other on the pump, and means to lock these members together against both relative longitudinal and rotative movements, said means exerting pressure on one of the members substantially radially of their common axis.

15. A device for mounting a pump on the front end of a motor vehicle with the pump shaft in alinement with and coupled to a motor shaft consisting of substantially concentric members, one on the vehicle and the other on the pump, means to lock these members together against relative longitudinal movement, said means exerting pressure on one of the members substantially radially of their common axis, said means being movable in a plane substantially at right angles to the axis of the motor shaft and on a line passing substantially through said axis.

16. In combination with the engine shaft of a motor vehicle and a fixed member having an opening therethrough substantially concentric with the axis of the engine shaft, a detachable air pump including a pump body and a pump shaft of less diameter than the engine shaft and in substantial alinement therewith, clutch means for connecting the shafts so that the pump shaft may be driven from the engine shaft, and means arranged to exert pressure upon the fixed member for preventing rotation of the pump body in both directions in respect to the engine shaft.

17. In combination with the engine shaft of a motor vehicle and a fixed member having an opening therethrough substantially concentric with the axis of the engine shaft, a detachable air pump including a pump body and a pump shaft of less diameter than the engine shaft and in substantial alinement therewith, a tubular clutch member on one of the shafts, a clutch member on the other shaft arranged to engage with the tubular clutch member so that the pump shaft may be driven from the engine shaft, and means arranged to engage with a member on the vehicle for preventing rotation of the pump body in both directions in respect to the engine shaft.

In testimony whereof I affix my signature in presence of two witnesses.

SILAS A. STRICKLAND.

Witnesses:
  ANNA M. DORR,
  CHAS. W. STAUFFIGER.